United States Patent [19]

Glendinning et al.

[11] 3,773,578

[45] Nov. 20, 1973

[54] METHOD OF CONTINUOUSLY ETCHING A SILICON SUBSTRATE

[75] Inventors: William B. Glendinning, Belford; Wellington B. Pharo, Neptune, both of N.J.

[73] Assignee: The United States of America as represented by the Secretary of the Army, Washington, D.C.

[22] Filed: Dec. 30, 1971

[21] Appl. No.: 214,461

Related U.S. Application Data

[63] Continuation-in-part of Ser. Nos. 124,915, March 16, 1971, Pat. No. 3,711,324, and Ser. No. 94,150, Dec. 1, 1970, Pat. No. 3,672,980, and Ser. No. 162,688, July 14, 1971, Pat. No. 3,718,503.

[52] U.S. Cl. .................................. 156/17, 148/175

[51] Int. Cl. .................................. H01l 7/44

[58] Field of Search .................................. 156/17

[56] References Cited

UNITED STATES PATENTS 3,615,956 10/1971 Irving et al. .................................. 156/17

*Primary Examiner*—Jacob H. Steinberg

*Attorney*—Harry M. Saragovitz et al.

[57] ABSTRACT

A silicon substrate is continuously etched by exposing the top surface of the silicon substrate in a closed chamber at a low temperature to a chemical vapor environment of nitric oxide, hydrogen fluoride, water and oxygen.

This invention relates in general to the art of treating a silicon substrate and in particular, to a method of continuously etching a silicon substrate to any desired depth.

3 Claims, No Drawings

METHOD OF CONTINUOUSLY ETCHING A SILICON SUBSTRATE

BACKGROUND OF THE INVENTION

This application is a continuation-in-part of the following U. S. patent applications filed by the inventors herein and assigned to a common assignee: Ser. No. 124,915, filed Mar. 16, 1971 for "Method of Forming a Diffusion Mask Barrier," now U.S. Pat. No. 3,711,324; Ser. No. 94,150, filed Dec. 1, 1970 for "Method of Rapidly Detecting Contaminated Semiconductor Surfaces," now U.S. Pat. No. 3,672,980; and Ser. No. 162,688, filed July 14, 1971 now U.S. Pat. No. 3,718,503 for "Method of Treating a Silicon Substrate."

In the aforementioned patent applications, the top surface of a silicon substrate is exposed to a chemical vapor environment of nitric oxide, hydrogen fluoride, and water. To obtain appreciable depths of etching as is required in device fabrication, the aforementioned methods require a number of film growth and removal cycles. The removal of film also calls for the use of sodium hydroxide, which, although complete in its chemical film removal, requires a thorough and time consuming washing procedure to remove all traces of sodium.

SUMMARY OF THE INVENTION

The general object of this invention is to provide a method of treating a silicon substrate at low temperatures. A further object of the invention is to provide such a method wherein the top surface of the silicon substrate is continuously etched to any desired depth and in which the silicon substrate is not exposed to any film removal steps. A still further object of the invention is to provide such a method wherein constant etch rates are used to etch to depths of hundreds of microns.

It has now been found that the foregoing objects can be attained by including oxygen in the chemical vapor environment. Thus, the new chemical vapor environment comprises an inert carrier gas, water, hydrogen fluoride, nitric oxide, and oxygen.

BRIEF DESCRIPTION OF THE PREFERRED EMBODIMENT

A silicon wafer of any crystallographic orientation and of any type impurity profile such as a $p^+$ type silicon wafer with a $p$ type epitaxial layer or impurity profile is placed in a suitable closed chamber purged with an inert gas such as argon. The wafer is then exposed to a chemical vapor pressure environment of 1 atmosphere consisting of about 80 to 120 millimeters mercury of nitric oxide, about 8 to 10 millimeters mercury of hydrogen fluoride, about 2 to 4 millimeters mercury of water, about 40 to 60 millimeters mercury of oxygen and inert carrier gas. At a temperature of about 26 to 33 degrees Centigrade, etch rates of about 0.2 to 2.0 micron per minute are obtained. The etch rate is constant and can be used to etch to depths of hundreds of microns.

The method can also be used to clean, polish, and etch a silicon surface in preparation for device processing.

We wish it to be understood that we do not desire to be limited to the exact details of procedure shown and described, for obvious modifications will occur to a person skilled in the art.

What is claimed is:

1. Method of continuously etching a silicon substrate to any desired depth, said method comprising exposing the top surface of the silicon substrate in a closed chamber at low temperature to a chemical vapor environment of nitric oxide, hydrogen fluoride, water and oxygen.

2. Method according to claim 1 wherein the chemical vapor environment is about 80 to 120 millimeters mercury of nitric oxide, about 8 to 10 millimeters mercury of hydrogen fluoride, about 2 to 4 millimeters mercury of water, about 40 to 60 millimeters mercury of oxygen, and up to 1 atmosphere of inert gas.

3. Method according to claim 2 wherein a temperature of about 26 to 33° C. is maintained at a pressure of about 1 atmosphere to obtain a constant etch rate of about 0.2 to 2.0 micron per minute.

* * * * *